US012127552B2

(12) United States Patent
Anderson et al.

(10) Patent No.: US 12,127,552 B2
(45) Date of Patent: Oct. 29, 2024

(54) DYNAMIC TANK MANAGEMENT BASED ON PREVIOUS ENVIRONMENT AND MACHINE MEASUREMENTS

(71) Applicant: Blue River Technology Inc., Sunnyvale, CA (US)

(72) Inventors: Kent Michael Anderson, Signal Mountain, TN (US); Benjamin Ray Chostner, San Francisco, CA (US)

(73) Assignee: BLUE RIVER TECHNOLOGY INC., Santa Clara, CA (US)

( * ) Notice: Subject to any disclaimer, the term of this patent is extended or adjusted under 35 U.S.C. 154(b) by 446 days.

(21) Appl. No.: 17/538,912

(22) Filed: Nov. 30, 2021

(65) Prior Publication Data
US 2023/0165234 A1 Jun. 1, 2023

(51) Int. Cl.
*A01M 7/00* (2006.01)
*G05D 1/00* (2006.01)
*G06V 20/10* (2022.01)

(52) U.S. Cl.
CPC ......... *A01M 7/0089* (2013.01); *G05D 1/0219* (2013.01); *G06V 20/188* (2022.01)

(58) Field of Classification Search
CPC .. A01M 7/0089; A01M 21/00; G05D 1/0219; G06V 20/188; A01C 21/00; A01N 25/00; A01N 43/40; A01N 2300/00; A01N 57/20; A01N 43/80; A01N 43/56
See application file for complete search history.

(56) References Cited

U.S. PATENT DOCUMENTS

| 2004/0136909 A1* | 7/2004 | Kisida | A01M 7/0089 424/9.2 |
| 2020/0230633 A1* | 7/2020 | Serrat | A01M 21/043 |
| 2022/0167546 A1* | 6/2022 | Tempel | A01C 21/007 |
| 2022/0167606 A1* | 6/2022 | Janssen | A01M 7/0089 |
| 2022/0256784 A1* | 8/2022 | Qiang | A01G 22/22 |

FOREIGN PATENT DOCUMENTS

| CA | 3134436 A1 | 10/2020 |
| CN | 108135122 A | 6/2016 |

OTHER PUBLICATIONS

European Patent Office, European Search Report and Written Opinion, European Patent Application No. 22210397, Apr. 14, 2023, 7 pages.

* cited by examiner

*Primary Examiner* — Alicia M. Choi
(74) *Attorney, Agent, or Firm* — Fenwick & West LLP

(57) ABSTRACT

Historical information is accessed that describes a previous state of a field, previous environmental conditions for the field, and previous farming machine actions performed in the field. A tank management model is applied to the historical information to determine expected weed densities within field portions and an amount of treatment fluid required to treat plants within the field. While the farming machine is treating plants in the field, current information describing a current state of the field is accessed. The tank management model is applied to the current information to determine updated weed densities within field portions not yet treated. The farming machine performs a modified plant treatment action based on the updated weed densities and a comparison of a remaining amount of treatment fluid within a tank of the farming machine and an updated amount of treatment fluid for treating plants within field portions not yet treated.

20 Claims, 9 Drawing Sheets

400

Access historical information 410

↓

Apply a tank management model to the accessed historical information to 420:

- Determine expected weed densities for field portions 430
- Determine an amount of treatment fluid required to treat plants based on the expected weed densities 440

↓

Access current information describing a current state of the field 450

↓

Apply the tank management model to the accessed current information to determine updated weed densities 460

↓

Perform modified plant treatment action 470

FIG. 4

DYNAMIC TANK MANAGEMENT BASED ON PREVIOUS ENVIRONMENT AND MACHINE MEASUREMENTS

BACKGROUND

Field of Disclosure

The disclosure generally relates to the field of tank management, and specifically to dynamic tank management based on previous environment and machine measurements.

Description of the Related Art

Material costs and regulatory requirements limit how much agricultural treatment material (e.g., pesticide) can be applied to land. However, regulatory requirements often also limit the ability to trailer agricultural machines having full and/or partially full tanks. Using current systems, it is difficult to manage an amount of agricultural treatment material in a tank of a machine as the machine performs agricultural operations. Accordingly, users of agricultural machines must often dispose of agricultural treatment material when usage is overestimated, causing unnecessary material costs.

SUMMARY

Systems and methods relate to treatment fluid tank management for a farming machine. In an embodiment, historical information is accessed. The historical information may describe a previous state of a field, previous environmental conditions for the field, and previous farming machine actions performed in the field. In some embodiments, the historical information may further describe a topography of the field. A tank management model is applied to the accessed historical information to determine an expected density of weeds within each of a plurality of portions within the field and an amount of treatment fluid required to treat plants within the field based on the expected density of weeds within each field portion.

While the farming machine is treating plants in the field with treatment fluid, current information describing a current state of the field is accessed. The current information may be a quantification of current weed locations and current weed numbers. Alternatively, or additionally, the current information may include at least one of a soil moisture, a sun exposure, a wind exposure, a temperature, a relative humidity, or a pressure. In some embodiments, the current information may be obtained from a camera capturing images of the field, a sensor attached to the farming machine, or the like.

The tank management model is applied to the accessed current information to determine an updated density of weeds within field portions that have not yet been treated. In some embodiments, applying the tank management model to the current information includes determining an actual weed density within one or more field portions based on the accessed information. In these embodiments, the updated amount of treatment fluid may be determined based on a comparison of the expected weed density within the field portions and the actual weed density within the one or more field portions.

The farming machine performs a modified plant treatment action based on the updated density of weeds and based on a comparison of a remaining amount of treatment fluid within a tank of the farming machine and an updated amount of treatment fluid for treating plants within field portions that have not yet been treated. In some embodiments, the modified plant treatment action is updated based on the locations of weeds within field portions not yet treated and the distances between the weeds within the field portions not yet treated.

The modified plant treatment action may include a drive path of the farming machine. In these embodiments, the drive path may be determined by identifying, from the field portions not yet treated, a subset of field portions with a weed density confidence less than a weed density confidence threshold and a subset of field portions with a weed density confidence greater than a weed density confidence threshold. The drive path may be determined based on the subsets of field portions, and the farming machine may perform the modified treatment action along the drive path.

BRIEF DESCRIPTION OF DRAWINGS

FIG. 4 illustrates a method of treatment fluid tank management, according to one embodiment.

Figure 1A:
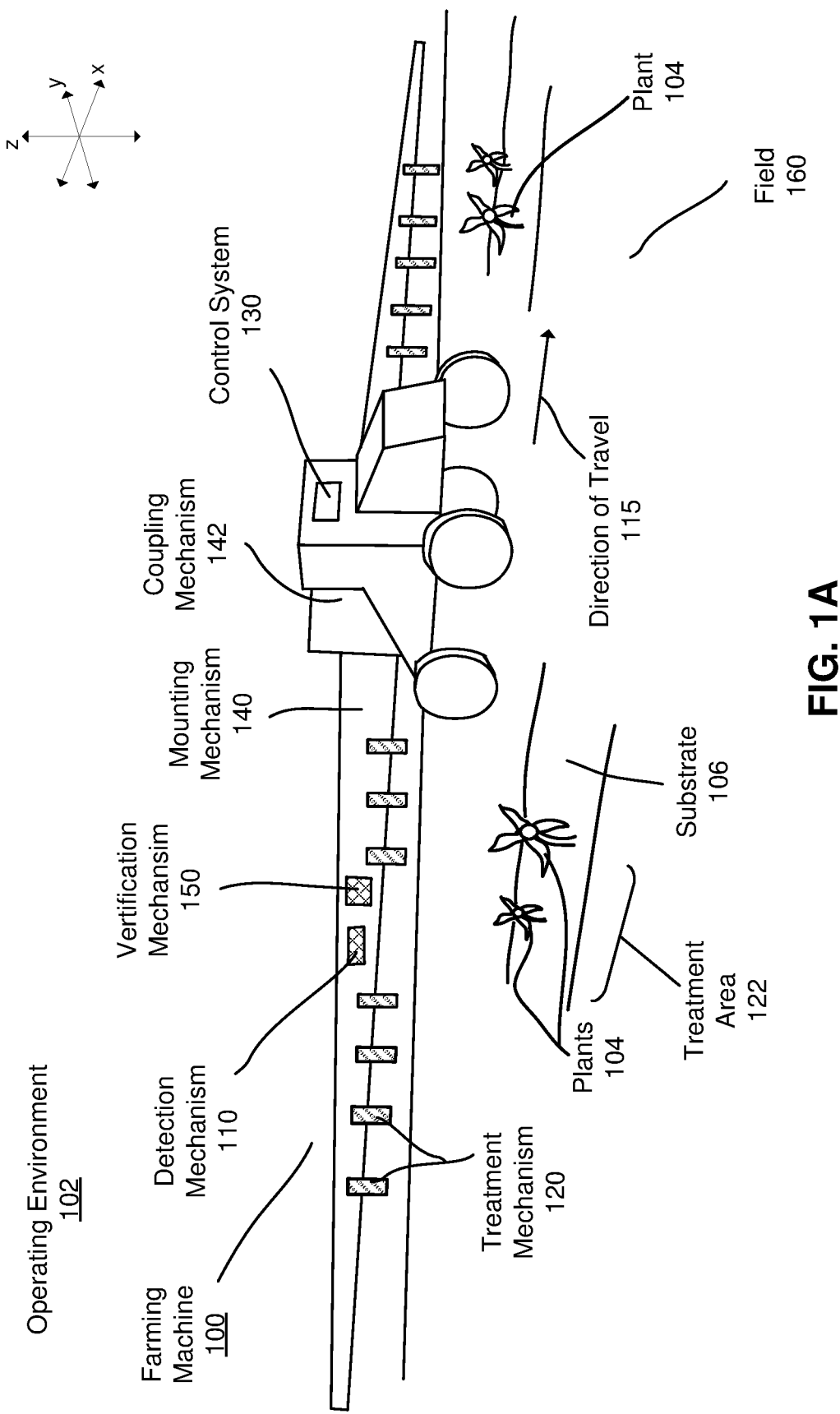
FIG. 1A illustrates an isometric view of a farming machine, according to one embodiment.

The figures depict various embodiments for purposes of illustration only. One skilled in the art will readily recognize from the following discussion that alternative embodiments of the structures and methods illustrated herein may be employed without departing from the principles described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

I. Introduction

A farming machine is configured to perform farming actions in a field, such as plant treatment actions, and the implemented farming actions are part of a dynamic tank management plan. To illustrate, the farming machine implements a farming action which applies a treatment (e.g., a spray treatment) to one or more plants, the ground, or the substrate (e.g., planting a seed) within a geographic area (e.g., a field).

Here, the plant treatment actions are included in a treatment plan to dynamically manage the plant treatment in a tank of the farming machine (e.g., a treatment fluid) in accordance with jurisdictional regulations on tank management. Treatments may be applied directly to a single plant, applied directly to multiple plants, applied indirectly to one or more plant, applied to the environment adjacent to one or more plants, or the like. After treatment application is complete, the amount of treatment in the tank of the farming machine will be in accordance with local and/or regional jurisdictional requirements (e.g., empty tank requirements for trailering a machine).

II. Field Management and Treatment Plans

Field Management

Agricultural managers ("managers") are responsible for managing farming operations in one or more fields. Managers work to implement a farming objective within those fields and select from among a variety of farming actions to implement that farming objective. Traditionally, managers are, for example, a farmer or agronomist that works the field but could also be other people and/or systems configured to manage farming operations within the field. For example, a manager could be an automated farming machine, a machine learned computer model, etc. In some cases, a manager may be a combination of the managers described above. For example, a manager may include a farmer assisted by a machine learned agronomy model and one or more automated farming machines or could be a farmer and an agronomist working in tandem.

Managers implement one or more farming objectives for a field. A farming objective is typically a macro-level goal for a field. For example, macro-level farming objectives may include treating crops with growth promotors, neutralizing weeds with growth regulators, harvesting a crop with the best possible crop yield, or any other suitable farming objective. However, farming objectives may also be a micro-level goal for the field. For example, micro-level farming objectives may include treating a particular plant in the field, repairing or correcting a part of a farming machine, requesting feedback from a manager, etc. Of course, there are many possible farming objectives and combinations of farming objectives, and the previously described examples are not intended to be limiting.

Faming objectives are accomplished by one or more farming machines performing a series of farming actions. Farming machines are described in greater detail below. Farming actions are any operation implementable by a farming machine within the field that works towards a farming objective. Consider, for example, a farming objective of harvesting a crop with the best possible yield. This farming objective requires a litany of farming actions, e.g., planting the field, fertilizing the plants 104, watering the plants 104, weeding the field, harvesting the plants, evaluating yield, etc. Similarly, each farming action pertaining to harvesting the crop may be a farming objective in and of itself. For instance, planting the field can require its own set of farming actions, e.g., preparing the soil, digging in the soil, planting a seed, etc.

In other words, managers implement a treatment plan in the field to accomplish a farming objective. A treatment plan is a hierarchical set of macro-level and/or micro-level objectives that accomplish the farming objective of the manager. Within a treatment plan, each macro or micro-objective may require a set of farming actions to accomplish, or each macro or micro-objective may be a farming action itself. So, to expand, the treatment plan is a temporally sequenced set of farming actions to apply to the field that the manager expects will accomplish the faming objective.

When executing a treatment plan in a field, the treatment plan itself and/or its constituent farming objectives and farming actions have various results. A result is a representation as to whether, or how well, a farming machine accomplished the treatment plan, farming objective, and/or farming action. A result may be a qualitative measure such as "accomplished" or "not accomplished," or may be a quantitative measure such as "40 pounds harvested," or "1.25 acres treated." Results can also be positive or negative, depending on the configuration of the farming machine or the implementation of the treatment plan. Moreover, results can be measured by sensors of the farming machine, input by managers, or accessed from a datastore or a network.

Traditionally, managers have leveraged their experience, expertise, and technical knowledge when implementing farming actions in a treatment plan. In a first example, a manager may spot check weed pressure in several areas of the field to determine when a field is ready for weeding. In a second example, a manager may refer to previous implementations of a treatment plan to determine the best time to begin planting a field. Finally, in a third example, a manager may rely on established best practices in determining a specific set of farming actions to perform in a treatment plan to accomplish a farming objective.

Leveraging manager and historical knowledge to make decisions for a treatment plan affects both spatial and temporal characteristics of a treatment plan. For instance, farming actions in a treatment plan have historically been applied to entire field rather than small portions of a field. To illustrate, when a manager decides to plant a crop, she plants 104 the entire field instead of just a corner of the field having the best planting conditions; or, when the manager decides to weed a field, she weeds the entire field rather than just a few rows. Similarly, each farming action in the sequence of farming actions of a treatment plan are historically performed at approximately the same time. For example, when a manager decides to fertilize a field, she fertilizes the field at approximately the same time; or, when the manager decides to harvest the field, she does so at approximately the same time.

Notably though, farming machines have greatly advanced in their capabilities. For example, farming machines 100 continue to become more autonomous, include an increasing number of sensors and measurement devices, employ higher amounts of processing power and connectivity, and implement various machine vision algorithms to enable managers to successfully implement a treatment plan.

Because of this increase in capability, managers are no longer limited to spatially and temporally monolithic implementations of farming actions in a treatment plan. Instead, managers may leverage advanced capabilities of farming machines to implement treatment plans that are highly localized and determined by real-time measurements in the field. In other words, rather than a manager applying a "best guess" treatment plan to an entire field, they can implement individualized and informed treatment plans for each plant in the field.

III. Farming Machine

Overview

A farming machine that implements farming actions of a treatment plan may have a variety of configurations, some of which are described in greater detail below.

Figure 1B:
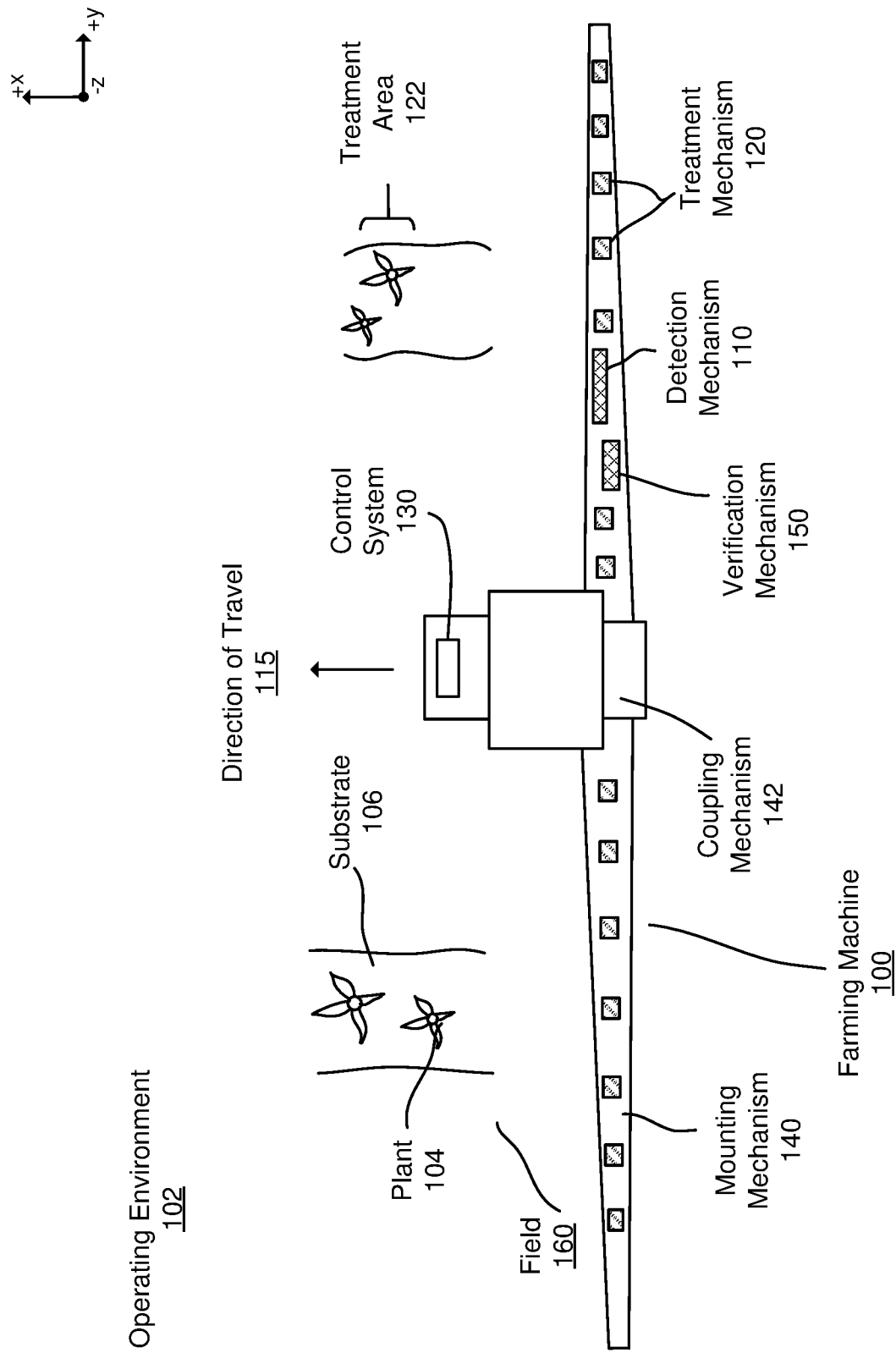
FIG. 1B illustrates a top view of the farming machine of FIG. 1A, according to one embodiment.
Figure 1C:
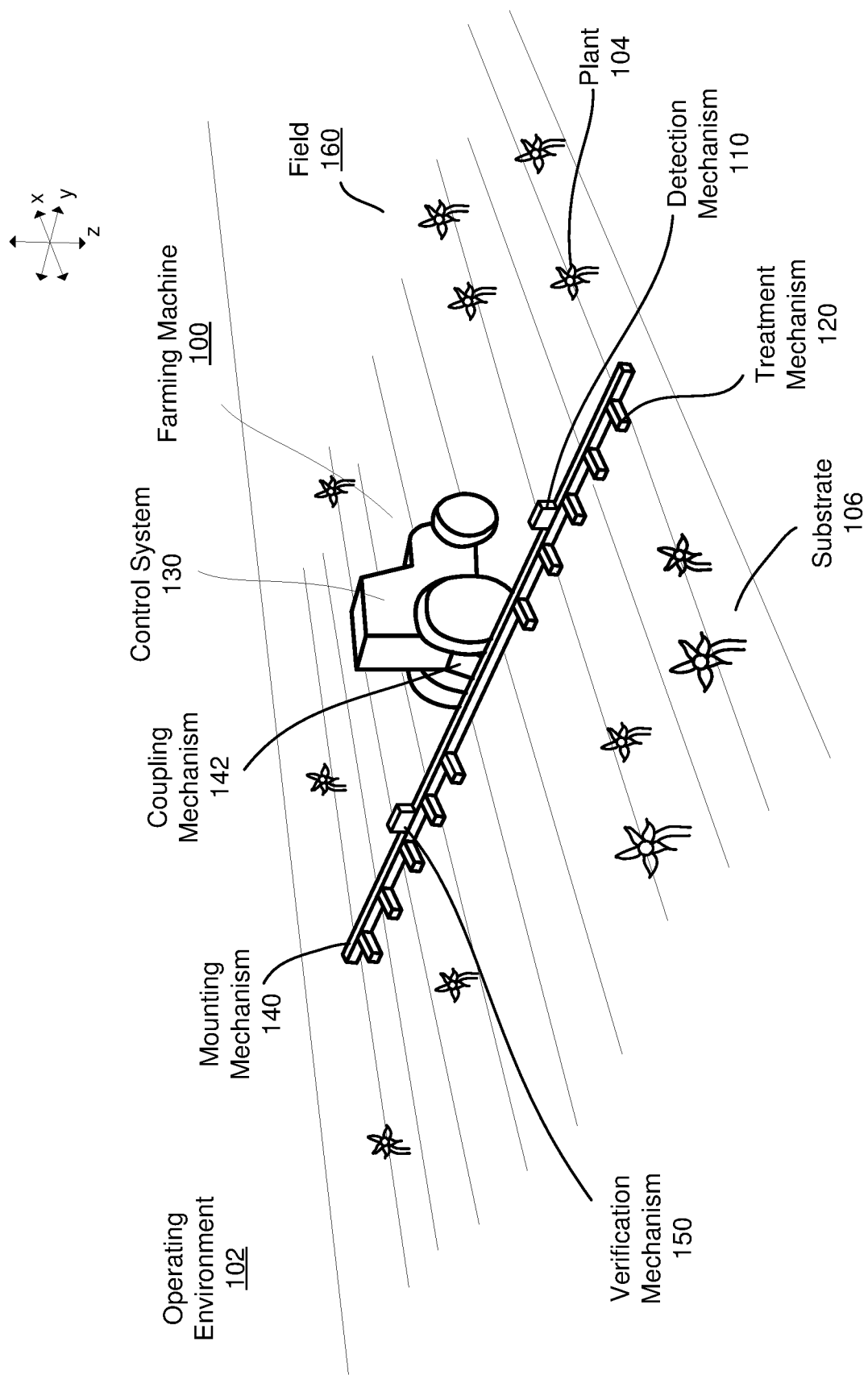
FIG. 1C illustrates an isometric view of an additional farming machine, according to one embodiment.

FIG. 1A is an isometric view of a farming machine 100 that performs farming actions of a treatment plan, according to one example embodiment, and FIG. 1B is a top view of the farming machine 100 in FIG. 1A. FIG. 1C is an isometric view of another farming machine 100 that performs farming actions of a treatment plan, in accordance with one example embodiment.

The farming machine 100 includes a detection mechanism 110, a treatment mechanism 120, and a control system 130. The farming machine 100 can additionally include a mounting mechanism 140, a verification mechanism 150, a power source, digital memory, communication apparatus, or any other suitable component that enables the farming machine 100 to implement farming actions in a treatment plan. Moreover, the described components and functions of the farming machine 100 are just examples, and a farming machine 100 can have different or additional components and functions other than those described below.

The farming machine 100 is configured to perform farming actions in a field 160, and the implemented farming actions are part of a treatment plan. To illustrate, the farming machine 100 implements a farming action which applies a treatment to one or more plants 104 and/or the substrate 106 within a geographic area. Here, the treatment farming actions are included in a treatment plan to regulate plant growth. As such, treatments are typically applied directly to a single plant 104, but can alternatively be directly applied to multiple plants 104, indirectly applied to one or more plants 104, applied to the environment 102 associated with the plant 104 (e.g., soil, atmosphere, or other suitable portion of the plant's environment adjacent to or connected by an environmental factors, such as wind), or otherwise applied to the plants 104.

In a particular example, the farming machine 100 is configured to implement a farming action which applies a treatment that necroses the entire plant 104 (e.g., weeding) or part of the plant 104 (e.g., pruning). In this case, the farming action can include dislodging the plant 104 from the supporting substrate 106, incinerating a portion of the plant 104 (e.g., with directed electromagnetic energy such as a laser), applying a treatment concentration of working fluid (e.g., fertilizer, hormone, water, etc.) to the plant 104, or treating the plant 104 in any other suitable manner.

In another example, the farming machine 100 is configured to implement a farming action which applies a treatment to regulate plant growth. Regulating plant growth can include promoting plant growth, promoting growth of a plant portion, hindering (e.g., retarding) plant 104 or plant portion growth, or otherwise controlling plant growth. Examples of regulating plant growth includes applying growth hormone to the plant 104, applying fertilizer to the plant 104 or substrate 106, applying a disease treatment or insect treatment to the plant 104, electrically stimulating the plant 104, watering the plant 104, pruning the plant 104, or otherwise treating the plant 104. Plant growth can additionally be regulated by pruning, necrosing, or otherwise treating the plants 104 adjacent to the plant 104.

Operating Environment

The farming machine 100 operates in an operating environment 102. The operating environment 102 is the environment 102 surrounding the farming machine 100 while it implements farming actions of a treatment plan. The operating environment 102 may also include the farming machine 100 and its corresponding components itself.

The operating environment 102 typically includes a field 160, and the farming machine 100 generally implements farming actions of the treatment plan in the field 160. A field 160 is a geographic area where the farming machine 100 implements a treatment plan. The field 160 may be an outdoor plant field but could also be an indoor location that houses plants such as, e.g., a greenhouse, a laboratory, a grow house, a set of containers, or any other suitable environment 102.

A field 160 may include any number of field portions. A field portion is a subunit of a field 160. For example, a field portion may be a portion of the field 160 small enough to include a single plant 104, large enough to include many plants 104, or some other size. The farming machine 100 can execute different farming actions for different field portions. For example, the farming machine 100 may apply an herbicide for some field portions in the field 160, while applying a pesticide in another field portion. Moreover, a field 160 and a field portion are largely interchangeable in the context of the methods and systems described herein. That is, treatment plans and their corresponding farming actions may be applied to an entire field 160 or a field portion depending on the circumstances at play.

The operating environment 102 may also include plants 104. As such, farming actions the farming machine 100 implements as part of a treatment plan may be applied to plants 104 in the field 160. The plants 104 can be crops but could also be weeds or any other suitable plant 104. Some example crops include cotton, lettuce, soybeans, rice, carrots, tomatoes, corn, broccoli, cabbage, potatoes, wheat, or any other suitable commercial crop. The weeds may be grasses, broadleaf weeds, thistles, or any other suitable determinantal weed.

More generally, plants 104 may include a stem that is arranged superior to (e.g., above) the substrate 106 and a root system joined to the stem that is located inferior to the plane of the substrate 106 (e.g., below ground). The stem may support any branches, leaves, and/or fruits. The plant 104 can have a single stem, leaf, or fruit, multiple stems, leaves, or fruits, or any number of stems, leaves or fruits. The root system may be a tap root system or fibrous root system, and the root system may support the plant 104 position and absorb nutrients and water from the substrate 106. In various examples, the plant 104 may be a vascular plant 104, non-vascular plant 104, ligneous plant 104, herbaceous plant 104, or be any suitable type of plant 104.

Plants 104 in a field 160 may be grown in one or more plant 104 rows (e.g., plant 104 beds). The plant 104 rows are typically parallel to one another but do not have to be. Each plant 104 row is generally spaced between 2 inches and 45 inches apart when measured in a perpendicular direction from an axis representing the plant 104 row. Plant 104 rows can have wider or narrower spacings or could have variable spacing between multiple rows (e.g., a spacing of 12 in. between a first and a second row, a spacing of 16 in. a second and a third row, etc.).

Plants 104 within a field 160 may include the same type of crop (e.g., same genus, same species, etc.). For example, each field portion in a field 160 may include corn crops. However, the plants 104 within each field 160 may also include multiple crops (e.g., a first, a second crop, etc.). For example, some field portions may include lettuce crops while other field portions include pig weeds, or, in another example, some field portions may include beans while other field portions include corn. Additionally, a single field portion may include different types of crop. For example, a single field portion may include a soybean plant 104 and a grass weed.

The operating environment 102 may also include a substrate 106. As such, farming actions the farming machine 100 implements as part of a treatment plan may be applied to the substrate 106. The substrate 106 may be soil but can alternatively be a sponge or any other suitable substrate 106. The substrate 106 may include plants 104 or may not include plants 104 depending on its location in the field 160. For example, a portion of the substrate 106 may include a row of crops, while another portion of the substrate 106 between crop rows includes no plants 104.

III.A Example Machine Configurations

Detection Mechanism(s)

The farming machine 100 may include a detection mechanism 110. The detection mechanism 110 identifies objects in the operating environment 102 of the farming machine 100. To do so, the detection mechanism 110 obtains information describing the environment 102 (e.g., sensor or image data), and processes that information to identify pertinent objects (e.g., plants 104, substrate 106, persons, etc.) in the operating environment 102. Identifying objects in the environment 102 further enables the farming machine 100 to implement farming actions in the field 160. For example, the detection mechanism 110 may capture an image of the field 160 and process the image with a plant 104 identification model to identify plants 104 in the captured image. The farming machine 100 then implements farming actions in the field 160 based on the plants 104 identified in the image.

The farming machine 100 can include any number or type of detection mechanism 110 that may aid in determining and implementing farming actions. In some embodiments, the detection mechanism 110 includes one or more sensors. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the detection mechanism 110 may include an array of sensors (e.g., an array of cameras) configured to capture information about the environment 102 surrounding the farming machine 100. For example, the detection mechanism 110 may include an array of cameras configured to capture an array of pictures representing the environment 102 surrounding the farming machine 100. The detection mechanism 110 may also be a sensor that measures a state of the farming machine 100. For example, the detection mechanism 110 may be a speed sensor, a heat sensor, or some other sensor that can monitor the state of a component of the farming machine 100. Additionally, the detection mechanism 110 may also be a sensor that measures components during implementation of a farming action. For example, the detection mechanism 110 may be a flow rate monitor, a grain harvesting sensor, a mechanical stress sensor etc. Whatever the case, the detection mechanism 110 senses information about the operating environment 102 (including the farming machine 100).

A detection mechanism 110 may be mounted at any point on the mounting mechanism 140. Depending on where the detection mechanism 110 is mounted relative to the treatment mechanism 120, one or the other may pass over a geographic area in the field 160 before the other. For example, the detection mechanism 110 may be positioned on the mounting mechanism 140 such that it traverses over a geographic location before the treatment mechanism 120 as the farming machine 100 moves through the field 160. In another examples, the detection mechanism 110 is positioned to the mounting mechanism 140 such that the two traverse over a geographic location at substantially the same time as the farming machine 100 moves through the filed. Similarly, the detection mechanism 110 may be positioned on the mounting mechanism 140 such that the treatment mechanism 120 traverses over a geographic location before the detection mechanism 110 as the farming machine 100 moves through the field 160. The detection mechanism 110 may be statically mounted to the mounting mechanism 140, or may be removably or dynamically coupled to the mounting mechanism 140. In other examples, the detection mechanism 110 may be mounted to some other surface of the farming machine 100 or may be incorporated into another component of the farming machine 100.

Verification Mechanism(s)

The farming machine 100 may include a verification mechanism 150. Generally, the verification mechanism 150 records a measurement of the operating environment 102 and the farming machine 100 may use the recorded measurement to verify or determine the extent of an implemented farming action (i.e., a result of the farming action).

To illustrate, consider an example where a farming machine 100 implements a farming action based on a measurement of the operating environment 102 by the detection mechanism 110. The verification mechanism 150 records a measurement of the same geographic area measured by the detection mechanism 110 and where farming machine 100 implemented the determined farming action. The farming machine 100 then processes the recorded measurement to determine the result of the farming action. For example, the verification mechanism 150 may record an image of the geographic region surrounding a plant 104 identified by the detection mechanism 110 and treated by a treatment mechanism 120. The farming machine 100 may apply a treatment detection algorithm to the recorded image to determine the result of the treatment applied to the plant 104.

Information recorded by the verification mechanism 150 can also be used to empirically determine operation parameters of the farming machine 100 that will obtain the desired effects of implemented farming actions (e.g., to calibrate the farming machine 100, to modify treatment plans, etc.). For instance, the farming machine 100 may apply a calibration detection algorithm to a measurement recorded by the farming machine 100. In this case, the farming machine 100 determines whether the actual effects of an implemented farming action are the same as its intended effects. If the effects of the implemented farming action are different than its intended effects, the farming machine 100 may perform a calibration process. The calibration process changes operation parameters of the farming machine 100 such that effects of future implemented farming actions are the same as their intended effects. To illustrate, consider the previous example where the farming machine 100 recorded an image of a treated plant 104. There, the farming machine 100 may apply a calibration algorithm to the recorded image to determine whether the treatment is appropriately calibrated (e.g., at its intended location in the operating environment 102). If the farming machine 100 determines that the farming machine 100 is not calibrated (e.g., the applied treatment is at an incorrect location), the farming machine 100 may calibrate itself such that future treatments are in the correct location. Other example calibrations are also possible.

The verification mechanism 150 can have various configurations. For example, the verification mechanism 150 can be substantially similar (e.g., be the same type of mechanism as) the detection mechanism 110 or can be different from the detection mechanism 110. In some cases, the detection mechanism 110 and the verification mechanism 150 may be one in the same (e.g., the same sensor). In an example configuration, the verification mechanism 150 is positioned distal the detection mechanism 110 relative the direction of travel 115, and the treatment mechanism 120 is positioned there between. In this configuration, the verification mechanism 150 traverses over a geographic location in the operating environment 102 after the treatment mechanism 120 and the detection mechanism 110. However, the mounting mechanism 140 can retain the relative positions of the system components in any other suitable configuration. In some configurations, the verification mechanism 150 can be included in other components of the farming machine 100.

The farming machine 100 can include any number or type of verification mechanism 150. In some embodiments, the verification mechanism 150 includes one or more sensors. For example, the verification mechanism 150 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the verification mechanism 150 may include an array of sensors (e.g., an array of cameras) configured to capture information about the environment 102 surrounding the farming machine 100. For example, the verification mechanism 150 may include an array of cameras configured to capture an array of pictures representing the operating environment 102.

Treatment Mechanism(s)

The farming machine 100 may include a treatment mechanism 120. The treatment mechanism 120 can implement farming actions in the operating environment 102 of a farming machine 100. For instance, a farming machine 100 may include a treatment mechanism 120 that applies a treatment to a plant 104, a substrate 106, or some other object in the operating environment 102. More generally, the farming machine 100 employs the treatment mechanism 120 to apply a treatment to a treatment area 122, and the treatment area 122 may include anything within the operating environment 102 (e.g., a plant 104 or the substrate 106). In other words, the treatment area 122 may be any portion of the operating environment 102.

When the treatment is a plant treatment, the treatment mechanism 120 applies a treatment to a plant 104 in the field 160. The treatment mechanism 120 may apply treatments to identified plants or non-identified plants. For example, the farming machine 100 may identify and treat a specific plant (e.g., plant 104) in the field 160. Alternatively, or additionally, the farming machine 100 may identify some other trigger that indicates a plant treatment and the treatment mechanism 120 may apply a plant treatment. Some example plant treatment mechanisms 120 include: one or more spray nozzles, one or more electromagnetic energy sources (e.g., a laser), one or more physical implements configured to manipulate plants, but other plant 104 treatment mechanisms 120 are also possible.

Additionally, when the treatment is a plant treatment, the effect of treating a plant 104 with a treatment mechanism 120 may include any of plant necrosis, plant growth stimulation, plant portion necrosis or removal, plant portion growth stimulation, or any other suitable treatment effect. Moreover, the treatment mechanism 120 can apply a treatment that dislodges a plant 104 from the substrate 106, severs a plant 104 or portion of a plant 104 (e.g., cutting), incinerates a plant 104 or portion of a plant 104, electrically stimulates a plant 104 or portion of a plant 104, fertilizes or promotes growth (e.g., with a growth hormone) of a plant 104, waters a plant 104, applies light or some other radiation to a plant 104, and/or injects one or more working fluids into the substrate 106 adjacent to a plant 104 (e.g., within a threshold distance from the plant). Other plant treatments are also possible. When applying a plant treatment, the treatment mechanisms 120 may be configured to spray one or more of: an herbicide, a fungicide, insecticide, some other pesticide, or water.

When the treatment is a substrate treatment, the treatment mechanism 120 applies a treatment to some portion of the substrate 106 in the field 160. The treatment mechanism 120 may apply treatments to identified areas of the substrate 106, or non-identified areas of the substrate 106. For example, the farming machine 100 may identify and treat an area of substrate 106 in the field 160. Alternatively, or additionally, the farming machine 100 may identify some other trigger that indicates a substrate 106 treatment and the treatment mechanism 120 may apply a treatment to the substrate 106. Some example treatment mechanisms 120 configured for applying treatments to the substrate 106 include: one or more spray nozzles, one or more electromagnetic energy sources, one or more physical implements configured to manipulate the substrate 106, but other substrate 106 treatment mechanisms 120 are also possible.

Of course, the farming machine 100 is not limited to treatment mechanisms 120 for plants 104 and substrates 106. The farming machine 100 may include treatment mechanisms 120 for applying various other treatments to objects in the field 160.

Depending on the configuration, the farming machine 100 may include various numbers of treatment mechanisms 120 (e.g., 1, 2, 5, 20, 60, etc.). A treatment mechanism 120 may be fixed (e.g., statically coupled) to the mounting mechanism 140 or attached to the farming machine 100. Alternatively, or additionally, a treatment mechanism 120 may movable (e.g., translatable, rotatable, etc.) on the farming machine 100. In one configuration, the farming machine 100 includes a single treatment mechanism 120. In this case, the treatment mechanism 120 may be actuatable to align the treatment mechanism 120 to a treatment area 122. In a second variation, the farming machine 100 includes a treatment mechanism 120 assembly comprising an array of treatment mechanisms 120. In this configuration, a treatment mechanism 120 may be a single treatment mechanism 120, a combination of treatment mechanisms 120, or the treatment mechanism 120 assembly. Thus, either a single treatment mechanism 120, a combination of treatment mechanisms 120, or the entire assembly may be selected to apply a treatment to a treatment area 122. Similarly, either the single, combination, or entire assembly may be actuated to align with a treatment area, as needed. In some configurations, the farming machine 100 may align a treatment mechanism 120 with an identified object in the operating environment 102. That is, the farming machine 100 may identify an object in the operating environment 102 and actuate the treatment mechanism 120 such that its treatment area aligns with the identified object.

A treatment mechanism 120 may be operable between a standby mode and a treatment mode. In the standby mode the treatment mechanism 120 does not apply a treatment, and in the treatment mode the treatment mechanism 120 is controlled by the control system 130 to apply the treatment. However, the treatment mechanism 120 can be operable in any other suitable number of operation modes.

Control System(s)

The farming machine 100 includes a control system 130. The control system 130 controls operation of the various components and systems on the farming machine 100. For instance, the control system 130 can obtain information about the operating environment 102, processes that information to identify a farming action to implement, and implement the identified farming action with system components of the farming machine 100.

The control system 130 can receive information from the detection mechanism 110, the verification mechanism 150, the treatment mechanism 120, and/or any other component or system of the farming machine 100. For example, the control system 130 may receive measurements from the detection mechanism 110 or verification mechanism 150, or information relating to the state of a treatment mechanism 120 or implemented farming actions from a verification mechanism 150. Other information is also possible.

Similarly, the control system 130 can provide input to the detection mechanism 110, the verification mechanism 150, and/or the treatment mechanism 120. For instance, the control system 130 may be configured input and control operating parameters of the farming machine 100 (e.g., speed, direction). Similarly, the control system 130 may be configured to input and control operating parameters of the detection mechanism 110 and/or verification mechanism 150. Operating parameters of the detection mechanism 110 and/or verification mechanism 150 may include processing time, location and/or angle of the detection mechanism 110, image capture intervals, image capture settings, etc. Other inputs are also possible. Finally, the control system may be configured to generate machine inputs for the treatment mechanism 120. That is translating a farming action of a treatment plan into machine instructions implementable by the treatment mechanism 120.

The control system 130 can be operated by a user operating the farming machine 100, wholly or partially autonomously, operated by a user connected to the farming machine 100 by a network, or any combination of the above. For instance, the control system 130 may be operated by an agricultural manager sitting in a cabin of the farming machine 100, or the control system 130 may be operated by an agricultural manager connected to the control system 130 via a wireless network. In another example, the control system 130 may implement an array of control algorithms, machine vision algorithms, decision algorithms, etc. that allow it to operate autonomously or partially autonomously.

The control system 130 may be implemented by a computer or a system of distributed computers. The computers may be connected in various network environments. For example, the control system 130 may be a series of computers implemented on the farming machine 100 and connected by a local area network. In another example, the control system 130 may be a series of computers implemented on the farming machine 100, in the cloud, a client device and connected by a wireless area network.

The control system 130 can apply one or more computer models to determine and implement farming actions in the field 160. For example, the control system 130 can apply a plant identification module to images acquired by the detection mechanism 110 to determine and implement farming actions. The control system 130 may be coupled to the farming machine 100 such that an operator (e.g., a driver) can interact with the control system 130. In other embodiments, the control system 130 is physically removed from the farming machine 100 and communicates with system components (e.g., detection mechanism 110, treatment mechanism 120, etc.) wirelessly.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

Other Machine Components

In various configurations, the farming machine 100 may include any number of additional components.

For instance, the farming machine 100 may include a mounting mechanism 140. The mounting mechanism 140 provides a mounting point for the components of the farming machine 100. That is, the mounting mechanism 140 may be a chassis or frame to which components of the farming machine 100 may be attached but could alternatively be any other suitable mounting mechanism 140. More generally, the mounting mechanism 140 statically retains and mechanically supports the positions of the detection mechanism 110, the treatment mechanism 120, and the verification mechanism 150. In an example configuration, the mounting mechanism 140 extends outward from a body of the farming machine 100 such that the mounting mechanism 140 is approximately perpendicular to the direction of travel 115. In some configurations, the mounting mechanism 140 may include an array of treatment mechanisms 120 positioned laterally along the mounting mechanism 140. In some configurations, the farming machine 100 may not include a mounting mechanism 140, the mounting mechanism 140 may be alternatively positioned, or the mounting mechanism 140 may be incorporated into any other component of the farming machine 100.

The farming machine 100 may include locomoting mechanisms. The locomoting mechanisms may include any number of wheels, continuous treads, articulating legs, or some other locomoting mechanism(s). For instance, the farming machine 100 may include a first set and a second set of coaxial wheels, or a first set and a second set of continuous treads. In the either example, the rotational axis of the first and second set of wheels/treads are approximately parallel. Further, each set is arranged along opposing sides of the farming machine 100. Typically, the locomoting mechanisms are attached to a drive mechanism that causes the locomoting mechanisms to translate the farming machine 100 through the operating environment 102. For instance, the farming machine 100 may include a drive train for rotating wheels or treads. In different configurations, the farming machine 100 may include any other suitable number or combination of locomoting mechanisms and drive mechanisms.

The farming machine 100 may also include one or more coupling mechanisms 142 (e.g., a hitch). The coupling mechanism 142 functions to removably or statically couple various components of the farming machine 100. For example, a coupling mechanism may attach a drive mechanism to a secondary component such that the secondary component is pulled behind the farming machine 100. In another example, a coupling mechanism may couple one or more treatment mechanisms 120 to the farming machine 100.

The farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be incorporated into another system component (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

III.B Example System Environment

Figure 2A:
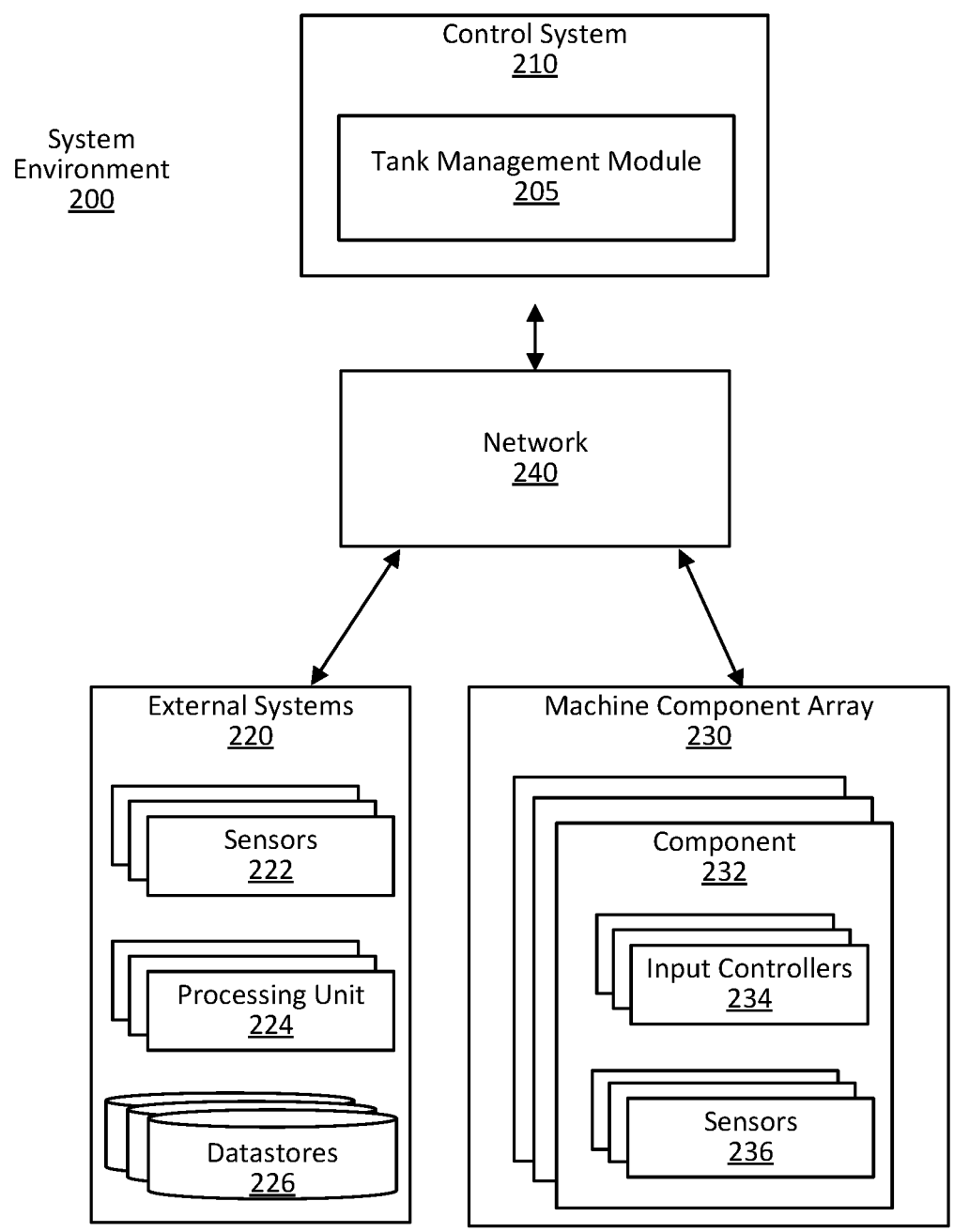
FIG. 2A is a block diagram of the system environment for a farming machine, according to one embodiment.

FIG. 2A is a block diagram of the system environment for the farming machine 100, in accordance with one or more example embodiments. In this example, the control system 210 (e.g., control system 130) is connected to external systems 220 and a machine component array 230 via a network 240 within the system environment 200.

The external systems 220 are any system that can generate data representing information relevant in the management of a tank of a farming machine 100. External systems 220 may include one or more sensors 222, one or more processing units 224, and one or more datastores 226. The one or more sensors 222 can measure the field 160, the operating environment 102, the farming machine 100, etc. and generate data representing those measurements. For instance, the sensors 222 may include a rainfall sensor, a wind sensor, heat sensor, a camera, etc. The processing units 224 may process measured data to provide additional information that may aid management of the tank in the field. For instance, a processing unit 224 may access an image of a field 160 and calculate a weed pressure from the image or may access historical weather information for a field 160 to generate a spray forecast for the field. Datastores 226 store historical information regarding the farming machine 100, the operating environment 102, the field 160, etc. that may be relevant in the management of a tank of a farming machine 100. For instance, the datastore 226 may store results of previously implemented treatment plans and farming actions for a field 160, a nearby field, and or the region. The historical information may have been obtained from one or more farming machines (i.e., measuring the result of a farming action from a first farming machine with the sensors of a second farming machine). Further, the datastore 226 may store results of specific faming actions in the field 160, or results of farming actions taken in nearby fields having similar characteristics. The datastore 226 may also store historical weather, flooding, field use, planted crops, etc. for the field and the surrounding area. Finally, the datastores 226 may store any information measured by other components in the system environment 200.

The machine component array 230 includes one or more components 232. Components 222 are elements of the farming machine 100 that can take farming actions (e.g., a treatment mechanism 120). As illustrated, each component has one or more input controllers 234 and one or more sensors 236, but a component may include only sensors 236 or only input controllers 234. An input controller 234 controls the function of the component 232. For example, an input controller 234 may receive machine commands via the network 240 and actuate the component 230 in response. A sensor 226 generates data representing measurements of the operating environment 102 and provides that data to other systems and components within the system environment 200. The measurements may be of a component 232, the farming machine 100, the operating environment 102, etc. For example, a sensor 226 may measure a configuration or state of the component 222 (e.g., a setting, parameter, power load, etc.), measure conditions in the operating environment 102 (e.g., moisture, temperature, etc.), capture information representing the operating environment 102 (e.g., images, depth information, distance information), and generate data representing the measurement(s).

The control system 230 receives information from external systems 220 and the machine component array 220 and implements a treatment plan in a field with a farming machine. In particular, the control system 230 employs tank management module 205 to dynamically manage one or more tanks of the farming machine 100 using information received from the external systems 210 and the machine component array 215. The tank management module 205 is described in greater detail below in regard to FIG. 2B.

The network 250 connects nodes of the system environment 200 to allow microcontrollers and devices to communicate with each other. In some embodiments, the components are connected within the network as a Controller Area Network (CAN). In this case, within the network each element has an input and output connection, and the network 250 can translate information between the various elements. For example, the network 250 receives input information from the camera array 210 and component array 220, processes the information, and transmits the information to the control system 230. The control system 230 generates a farming action based on the information and transmits instructions to implement the farming action to the appropriate component(s) 222 of the component array 220.

Additionally, the system environment 200 may be other types of network environments and include other networks, or a combination of network environments with several networks. For example, the system environment 200, can be a network such as the Internet, a LAN, a MAN, a WAN, a mobile wired or wireless network, a private network, a virtual private network, a direct communication line, and the like.

IV. Tank Management

Figure 2B:
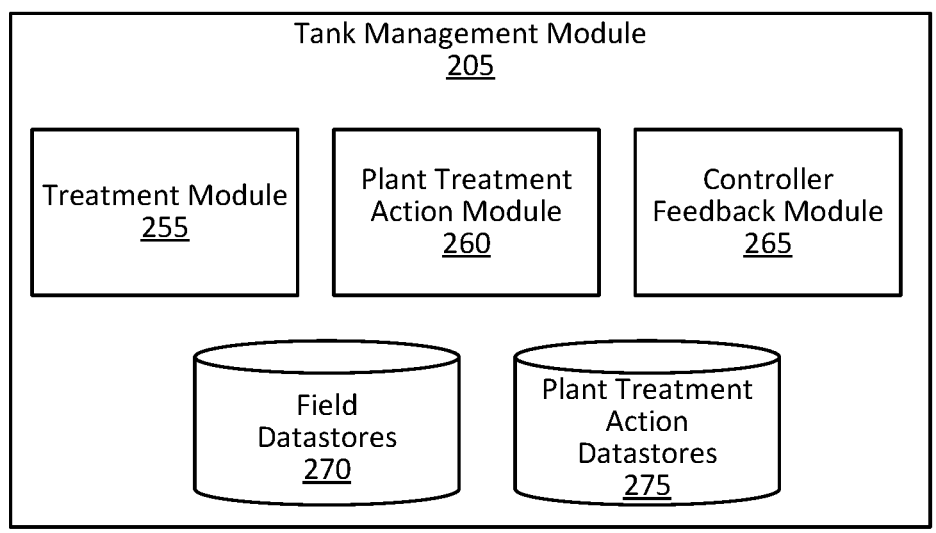
FIG. 2B is a block diagram of a tank management module for tank management, according to one embodiment.

As described above, the farming machine 100 and the system environment 200 include components configured to dynamically manage the tank of a farming machine as part of a treatment plan. FIG. 2B is a block diagram of a tank management module 205 for tank management, according to one embodiment. In the embodiment shown, the tank management module 205 includes a treatment module 255, a plant treatment action module 260, a controller feedback module 265, field datastores 270, and plant treatment action datastores 275. In alternative embodiments, the tank management module 205 may include different and/or additional components. In addition, the functionality of each of the components may be distributed in a different manner than to that described herein.

The treatment module 255 determines an amount of material (i.e., treatment material) required to treat one or more field portions. The treatment module 255 may determine an amount of material required based on historical information associated with the field. Historical information may include, but is not limited to, a previous state of a field, previous conditions for the field, previous farming machine 100 actions performed in the field, historical information associated with adjacent fields, historical information associated with field having similar geography and/or topographies as the field, historical information associated with field used to plant, harvest, and/or process similar crops to the field, or the like.

Historical information describing a previous state of the field may include data describing a type of crop planted in the field; a treatment status of the field (e.g., complete, partially complete, incomplete, etc.); types of treatment applied to the field during planting, harvesting, and/or processing the field; processing techniques implemented; irrigation schemes used to irrigate the field; crop rotation schemes; or the like. Previous conditions of the field may include previous environmental conditions, such as temperature, relative humidity, sun exposure, air pressure, soil composition, soil acidity, botany, etc. Previous farming actions may include any farming action implemented during planting, harvesting, and/or processing a crop from a portion of a field, such as treatment application, irrigation, harvesting, tilling, etc. For example, data describing previous farming actions performed in the field may include treatment data resulting from a treatment applied to one or more field portions during the planting of a field. Treatment data includes types of treatment applied (e.g., herbicides, pesticides, fungicides, irrigation, etc.), amounts of treatment applied, frequency of treatment application(s), status of treatment applied (e.g., complete, partially complete, incomplete), etc.

Historical information may be collected from one or more sensors of the farming machine 100 (e.g., an array sensor 236), one or more external sensors 222, or the like. Historical information may be accessed from one or more databases of the tank management module 205, one or more databases connected to the farming machine 100 through the network 220, etc. In addition, historical information may be updated at predetermined frequencies, in response to a request from a user, in response to an indication that a farming action was performed on a portion of a field, or the like.

To determine an amount of material required for treatment of a portion of a field, the treatment module 255 may apply the historical data to a tank management model that is configured to predict an amount of treatment required to treat a portion of a field. The tank management model may be a trained machine learning model, a heuristic, a statistical model, an algorithm, or the like. Examples include, but are not limited to, linear regression models, logistic regression models, random forest classifiers, neural networks, ANOVA, principal component analysis, decision trees, support vector machines, boosting for other algorithms (e.g., AdaBoost), clustering models, naïve Bayes classifiers, memory-based learning, bagged trees, boosted stump, etc.

In some embodiments, the treatment module 255 determines an amount of material required for treatment of a portion of a field based on an expected and/or actual weed density in the portion of the field. A weed density is a number of weeds in an area of land. The size of the area of land may vary based on user preferences. For example, a weed density may reflect a number of weeds in a field, a number of weeds in a portion of a field, a number of weeds in a substrate, etc., selected by a user of the farming machine 100, predetermined by the farming machine 100, recommended by the farming machine 100, etc.

In addition, a weed density may be weed-species specific. For example, an area of land (e.g., a field portion) may be associated with a first weed density associated with a first weed species and a second weed density associated with a second weed species. An expected weed density is a predicted measure of weed density for one or more field portions. An expected weed density may be associated with a weed density confidence, indicating a likelihood an area associated with the expected weed density has the weed density. For example, a portion of a field may have an expected weed density of a hundred weeds per acre with a seventy percent confidence. An actual weed density may be an observed, measured, and/or calculated density of weeds within one or more field portions.

The treatment module 255 may predict an expected weed density using the tank management model. In these embodiments, the tank management model may predict an expected weed density for a portion of the field and a required amount of treatment of a portion of the field concurrently, consecutively, or a combination thereof. For example, the tank management model may first predict an expected weed density for a portion of a field and then predict an amount of treatment required for the portion of the field based, in part, on the expected weed density. In addition, the tank management model may determine a corresponding weed density confidence for each predicted expected weed density.

The tank management model may predict expected weed densities based on the accessed historical information, sensor data (e.g., image data obtained from one or more camera), or the like. Alternatively, or additionally, the treatment module 255 may predict an expected weed density using a separate weed density model, such as a separate machine learning model, statistical model, heuristic, or the like. In these embodiments, the output from the weed density model may be further input to the tank management model used to predict an amount of treatment required to treat a portion of a field. The weed density model may predict expected weed densities based on historical information of the field, historical environmental weather, historical geography weather, historical botany, sensor data, or the like.

The treatment module 255 may determine an actual weed density using sensor data collected from the field, such as image data obtained from a camera. Sensor data may be obtained from one or more sensors of the tank management module 205 (e.g., an array sensor 236), external sensors 222, or the like. In these embodiments, the actual weed density data may be further input to the tank management model to predict an amount of treatment required to treat a portion of the field. In some embodiments, the treatment module 255 may determine an actual weed density for one or more field portions and predict an updated expected weed density for one or more additional field portions. For example, the treatment module 255 may determine an actual weed density in a representative portion of the field and extrapolate the weed densities in different field portions based on the determined actual density, the location of the different portions in the field, the topographies of the field portions, the geographies of the field portions, the geometries of the field portions, the crops planted in the field portions, or the like.

In some embodiments, the treatment module 255 may determine an updated weed density of field portions based on current data describing a current state of the field. Current data may include a soil moisture, a sun exposure, a wind exposure, a temperature, a relative humidity, a pressure, etc. of one or more field portions. Current data may also include actual weed densities from one or more field portions, as described above. Current data may be accessed while the farming machine 100 is treating one or more field portions. For example, the farming machine 100 may begin treating one or more field portions based on the expected density. Concurrently, one or more sensors may measure the one or more field portions being treated. The farming machine 100 may access the current data obtained from the one or more sensors, such as a camera capturing images of the field. The one or more sensors capturing current data may include a sensor measuring the field that is attached to the farming machine 100, a sensor that is external to the farming machine 100, a combination thereof, or the like. The tank management module 255 may apply the current data to the tank management model to predict updated weed densities within field portions, such as field portions not yet treated.

In some embodiments, the treatment module 255 determines an amount of material required for treatment of a portion of a field based, in part, on the location of weeds within the field and/or buffers around the weeds within the field. As discussed above, the amount of material required to treat an area may be based on the weed density, a number of weeds in an area of land. For example, an acre of a field covered in 2% weeds may require less herbicide than an acre of a field covered in 10% weeds. Alternatively, or additionally, the amount of material required to treat an area may be based on the location of the weeds within the field and/or a buffer around each weed. A buffer is an area around a weed in which treatment is applied. The size and/or shape of a buffer may vary based on weed species, user preferences, jurisdictional regulations, buffer recommendations determined by the farming machine 100, or the like. Depending on the size of the buffer and/or the location of the weeds, weeds may be located within the buffers of adjacent weeds. When weeds are within the buffers of adjacent weeds, less material may be required overall because weeds will receive residual spray applied to neighboring weeds. When the weeds are not within the buffers of adjacent weeds, more material may be required because weeds will not receive residual spray applied to neighboring weeds. As an example, two fields of similar size may each by covered in 5% weeds. However, a majority of the weeds in the first of the two fields may be located within one portion of the field and the majority of weeds in the second field may be distributed across all portions of the second field. Thus, weeds in the first field are more likely to be located in the buffers of adjacent weeds than weeds in the second field. Accordingly, more herbicide may be required to treat the weeds in the second field than the first field.

Additionally, the treatment module 255 can determine an amount of treatment material based on the treatment material itself. That is, the tank management module 205 may store exemplary treatment parameters for each treatment material and determine amounts of treatment material based on the exemplary treatment parameters. Some stored treatment parameters may include maximum or minimum treatment densities, maximum or minimum treatment flow rates, maximum of minimum total density per unit time, etc. Moreover, the treatment parameters may be used to constrain any interpolation or modelling of data from the other methods described herein. In this manner, the treatment module can generate treatment actions for tank management that adhere to jurisdictional limits.

The plant treatment action module 260 determines a plant treatment action for the farming machine 100 to perform for tank management of the farming machine 100. Plant treatment actions include, but are not limited to, application of treatment material to a field, a portion of a field, a substrate, or a plant. Plant treatment actions may include how treatment is applied. For example, the plant treatment action module 260 may determine an application rate of treatment, how an application rate is controlled, which mixes of treatment to apply, size and/or geometries of buffer zones around each weed, or the like, for each plant treatment action. Application rates may be controlled based on a spray rate, a spray pressure, a speed of the farming machine 100, etc.

Plant treatment actions may also include how the farming machine 100 operates during implementation of a plant treatment action. For example, the plant treatment action module 255 may determine a drive path of a farming machine 100 along which the farming machine 100 operates during treatment application, an amount of material to fill one or more tanks of the farming machine 100, a number of tanks to fills, a nozzle type, or the like. Additional plant treatment actions for dynamically managing the tank of the farming machine 100 may include varying pressure, vehicle speed, boom height, flow rate, and selecting different nozzle tips (i.e., managing the amount of liquid exiting the tank). Moreover, the level of granularity of a plant treatment action may vary. In some embodiments, the plant treatment action module 260 may determine a different plant treatment actions for each field, each portion of a field, each substrate within a field, each plant within a field, or the like.

In some embodiments, the plant treatment action module 260 identifies a drive path of a farming machine 100 such that a tank of the farming machine 100 is empty upon completion of field treatment, empty upon arrival at a tendering station of a field, empty and/or partially empty on sensitive areas of the field (e.g., area of the field with reduced loading threshold, areas of the field with steep inclines, etc.), or the like. In one example drive path, a farming machine 100 makes an initial pass of one or more field portions to sample the field and makes one or more additional passes to apply treatment to the field portions. In another example drive path, a farming machine 100 makes an initial pass around the entirety of the field to apply a first round of treatment and makes one or more additional passes to apply additional treatment to different field portions based on determined actual weed density, an amount of treatment remaining in the tank of the farming machine 100, etc. In another example drive path, the farming machine 100 may first apply treatment to an inner portion of the field and then sequentially apply treatment to the perimeter of the field. In this example, the farming machine 100 may broadcast any remaining treatment material in the tank of the farming machine 100 such that it is empty upon completion of treatment application. Broadcast spraying indicates engaging every treatment mechanism 120 of the farming machine 100 to spray all of the corresponding treatment areas 122 (rather than specific treatment mechanisms 120 spraying identified plants 102 in specific treatment areas 122).

In another example drive path, a farming machine 100 applies treatment to field portions having a sloping angle less than a threshold sloping angle and then apply treatment to portion of the field having a sloping angle greater than or equal to a threshold sloping angle. In another example drive path, a farming machine 100 applies a first treatment to field portions in a first pass and a second treatment to portion of the field in a second path. In a further example drive path, a farming machine 100 applies a treatment to field portions with a first nozzle in a first pass and the treatment to field portions with a second nozzle in a second pass. For example, the farming machine 100 may spray specific plants with a fine nozzle in a first pass and may broadcast the contents of a tank of the farming machine 100 with a wide nozzle in a second pass.

The plant treatment action module 260 may determine a plant treatment action based on the output of the treatment module 255, such as expected weed densities of field portions, actual weed densities of field portions, required material amounts for field portions, or the like. In addition, the plant treatment action may be based on one or more goals of a user of the farming machine 100, such as emptying the tank upon treatment completion of the field, reducing the material costs, environmental goals, yield goals, or the like. The plant treatment action may be further based on the type of treatment being applied, jurisdictional requirements, the types of crop planted, environmental conditions, etc.

The plant treatment action module 260 may update one or more plant treatment actions as a field is being treated. The plant treatment action module 260 may update a plant treatment action based on differences between expected and actual weed densities and the goals of a user of the farming machine 100. Updates may include increasing treatment application rates to empty a tank, decreasing application rates to slow down material use, redirecting the farming machine 100 along a different drive path, altering a mix of two or more treatments, etc.

The tank management module 205 stores field data in one or more field datastores 270. Field data includes, but is not limited to, a size of a field, a geometry of a field, a location of the field, a number of portions in a field, crops planted in the field, entities associated with the field, a geography of the field, a topology of the field, environmental conditions of a field (e.g., temperate, pressure, relative humidity, sun exposure, etc.), a soil composition of the field, a jurisdiction of the field, system aggressiveness (i.e., accounting for identification uncertainty), spray buffers, or the like.

The plant treatment action datastores 275 may store data describing plant treatment actions implemented in one or more fields during one or more seasons. Data may indicate a type of plant treatment action, which field portions correspond to a plant treatment action, a method of implementation of the plant treatment action, or the like. The plant treatment action datastore 275 may also store model parameters for one or more tank management models, one or more weed density models, and/or model parameters for plant treatment action models.

The plant treatment action datastores 275 may also include training, testing, and/or validation data. Training, testing, and/or validation data is used to train, test, and/or validate one or more models used by the tank management module 205. Training, testing, and/or validation data may include plant treatment actions from one or more seasons, corresponding crop outcomes from the one or more seasons, corresponding weed densities from the one or more seasons, corresponding tank usages, environmental data, machine data, geography data, field data, or the like. In some embodiments, data may be labeled. Labels may indicate an actual weed density, an amount of material used, a method of material application, field conditions, machine conditions, field locations, entities associated with the field, etc. When data is labeled, one or more models used by the tank management module 205 may be trained using supervised and/or semi-supervised learning. In some embodiments, a portion of the data is unlabeled. Accordingly, one or more models used by the tank management module 205 may be trained using semi-supervised and/or unsupervised learning.

IV.A Example Treatment Plans for Tank Management

Figure 3A:
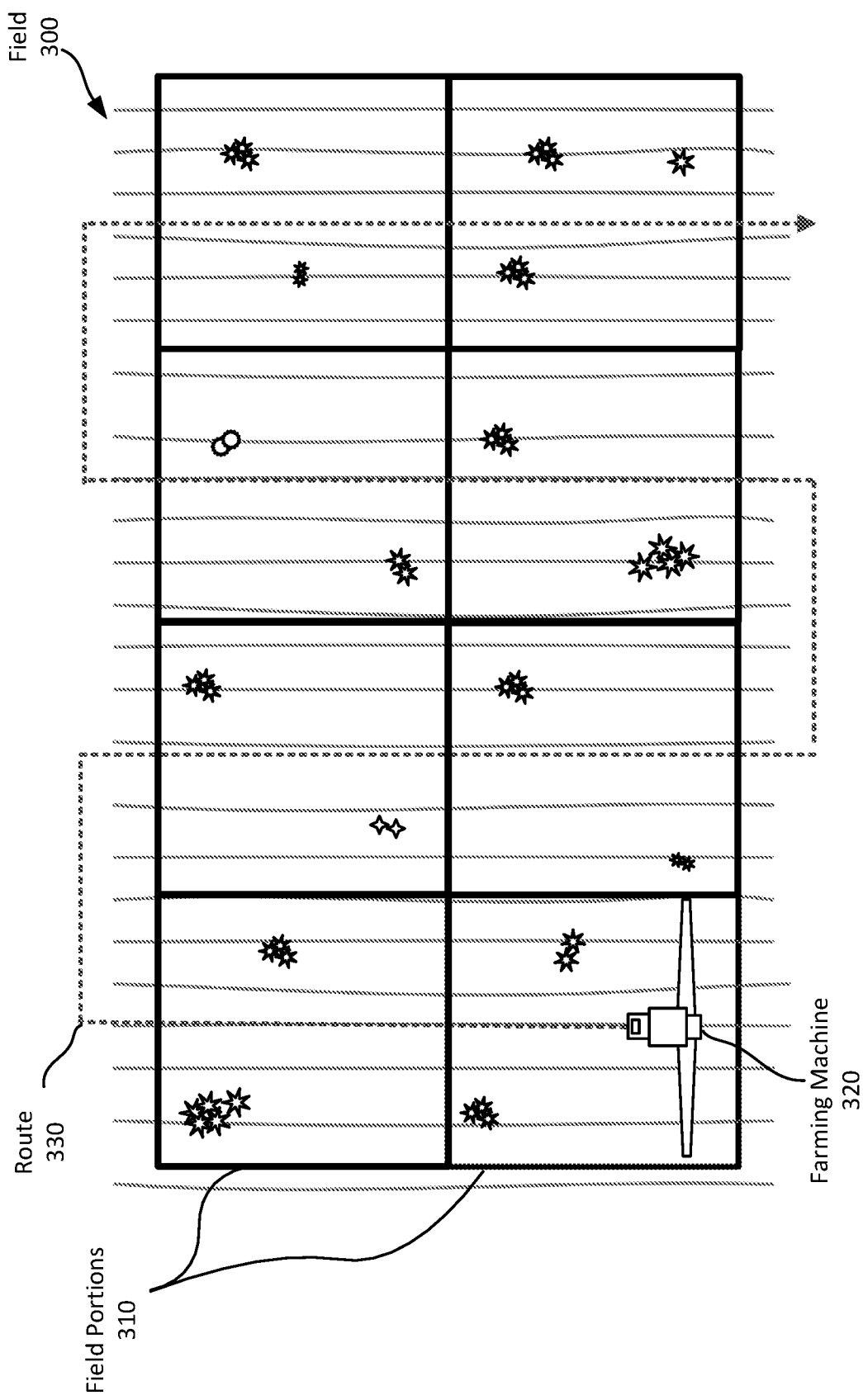
FIG. 3A illustrates a first treatment plan performed by a farming machine, according to one embodiment.

FIG. 3A illustrates a first treatment plan with one or more plant treatment actions performed by a farming machine, according to one embodiment. A field 300 includes field portions 310 to be treated by the farming machine 320 (e.g., farming machine 100) along a route (e.g., drive path) 330. In the first treatment plan, each field portion 310 is associated with one or more plant treatment actions determined based on an expected weed density in each portion 310. The plant treatment actions may be further determined based on the expected locations of weeds within each field portion 310.

Figure 3B:
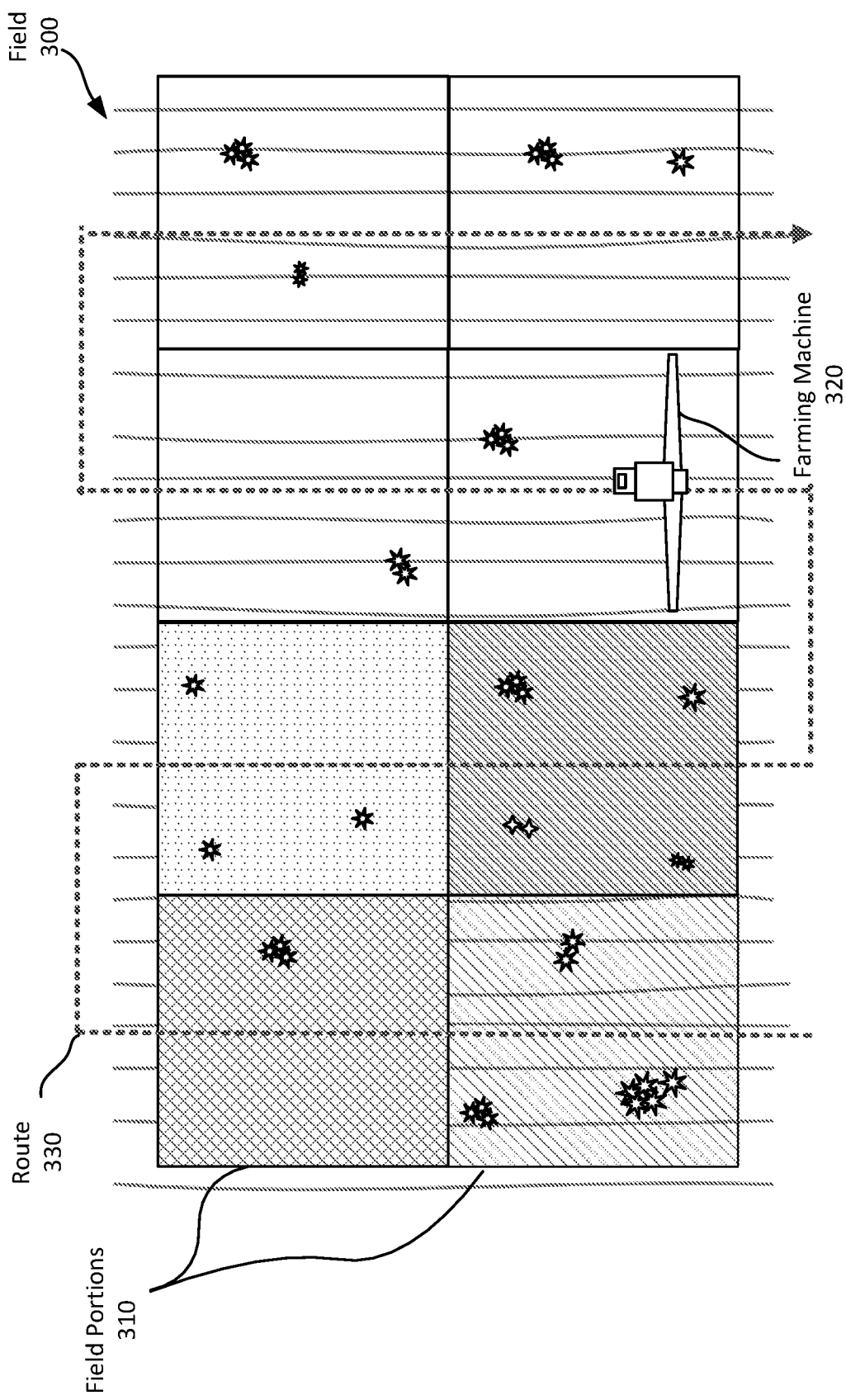
FIG. 3B illustrates an updated treatment plan performed by the farming machine, according to one embodiment.

FIG. 3B illustrates a second treatment with one or more plant treatment actions performed by the farming machine, according to one embodiment. The second treatment plan is an updated treatment plan, updated by the tank management module 205 as the farming machine 320 the field portions 310. The tank management module 205 may update the treatment plan based on current data obtained while the farming machine 320 treats one or more field portions 310. The treatment plan may also be updated based on an amount of treatment left in a tank of the farming machine 320, a location of the farming machine 320 within the field 300, or the like. In the illustrated example, updated treatment actions are represented by different types of shading. So, for example, each of the illustrated field portions may have received a different amount of spray as determined by the tank management module.

In some embodiments, as the farming machine 320 completes the route 330 and determines an actual weed density in one or more field portions 310, the tank management module 205 may update and/or change a plant treatment action for one or more field portions 310. In the illustration shown, the actual location and weed density of weeds within field 300 is different than expected weed locations and weed densities.

IV.B Example Method for Tank Management

FIG. 4 illustrates a method of treatment fluid tank management, according to one embodiment. In the method 400 shown, historical information is accessed 410. The historical information may describe a previous state of a field, previous environmental conditions for the field, and previous farming machine 100 actions performed in the field. A tank management model is applied 420 to the accessed historical information to determine 430 an expected density of weeds within each of a plurality of portions within the field. Further, the tank management model is applied 420 to the accessed historical information to determine 440 an amount of treatment fluid required to treat plants within the field based on the expected density of weeds within each field portion.

While the farming machine 100 is treating plants in the field with treatment fluid, current information describing a current state of the field is accessed 450. In some embodiments, the current information is a quantification of current weed locations and current weed numbers. Alternatively, or additionally, the current information may include at least one of a soil moisture, sun exposure, wind exposure, a temperature, a relative humidity, or a pressure associated with the field and/or field portions. The current information may be obtained from an image sensor (e.g., a camera) capturing images of the field. The current information may also be obtained from a sensor attached to the farming machine 100.

The tank management model is applied 460 to the accessed current information to determine an updated density of weeds within field portions that have not yet been treated. In some embodiments, applying 460 the tank management model to the accessed information includes determining the updated amount of treatment fluid for the treatment of the plants within the field portions that have not yet been treated. Alternatively, or additionally, applying 460 the tank management model to the accessed information includes determining an actual weed density within one or more field portions of the plurality of field portions based on the accessed current information, and determining the updated amount of treatment fluid based on a comparison of the expected weed density within the plurality of field portions within the field and the actual weed density within the one or more field portions of the plurality of field portions.

The farming machine 100 performs 470 a modified plant treatment action based on the updated density of weeds and based on a comparison of a remaining amount of treatment fluid within a tank of the farming machine 100 and an updated amount of treatment fluid for treating plants within field portions that have not yet been treated. In some embodiments, the modified treatment action includes a drive path of the farming machine 100. In these embodiments, the drive path may be determined by identifying a first subset of field portions that have not yet been treated and that have a weed density confidence less than a weed density confidence threshold. A second subset of field portions with a weed density confidence greater than the weed density confidence may be identified. In these embodiments, a drive path is determined based on the first subsets of field portions and the second subset of field portions, and the farming machine 100 performs the modified plant treatment action along the drive path. Alternatively, or additionally, responsive to performing the modified plant treatment action, an updated remaining amount of treatment fluid within the tank may be determined. An updated modified plant treatment action may be determined based on the updated remaining amount of treatment fluid within the tank.

In some embodiments, locations of weeds within field portions that have not yet been treated are determined. Distances between the weeds within the field portions that have not yet been treated may also be determined. In these embodiments, the modified plant treatment plan is updated based on the locations of the weeds within the field portions that have not yet been treated and the distances between the weeds within the field portions that have not yet been treated. In some embodiments, the historical information may describe a topography of the field. In these embodiments, the modified plant treatment action may be further based on the topography of the field.

VI. Control System

Figure 5:
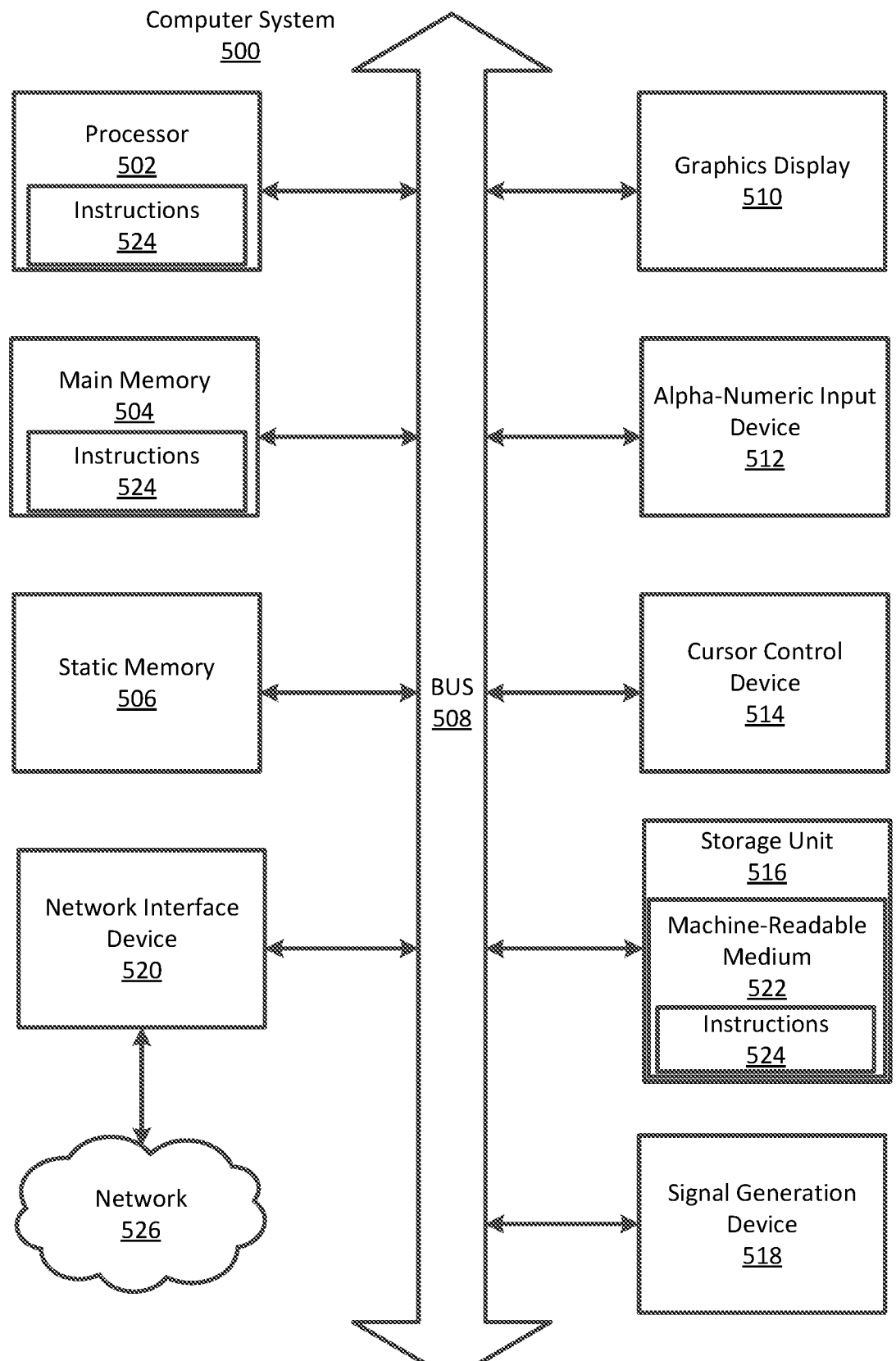
FIG. 5 is a block diagram illustrating components of an example machine for reading and executing instructions from a machine-readable medium, according to one example embodiment.

FIG. 5 is a block diagram illustrating components of an example machine for reading and executing instructions from a machine-readable medium. Specifically, FIG. 5 shows a diagrammatic representation of control system 130 in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504, and the storage unit 516 communicate via a bus 508.

In addition, the computer system 500 can include a static memory 506, a graphics display 510 (e.g., to drive a plasma display panel (PDP), a liquid crystal display (LCD), or a projector). The computer system 500 may also include alphanumeric input device 512 (e.g., a keyboard), a cursor control device 55 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. For example, the instructions 524 may include the functionalities of modules of the system 130 described in FIG. 2. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 (e.g., network 220) via the network interface device 520.

VII. Additional Configurations

Notably, the description above largely describes dynamically controlling the tank of a farming machine who is performing spray treatments. That is, the tank of the farming machine is filled with a liquid. However, tanks on farming machines need not always include a liquid. In some embodiments, the tank of a farming machine can include a solid (e.g., a seed). In these circumstances, the principles described above to dynamically manage a tank including solids still apply. For example, the farming machine may leverage sensor information from external systems and the farming machine itself to determine farming actions for planting crops. That is, the farming machine may determine past weed pressures, current weed pressures, and expected weed pressures to determine how to plant seeds in field portions of the field. For instance, increasing the seeding rate in field portions where past and current weed pressures indicated that expected weed pressures will be lower. Other factors for seeds may include topography, soil type, moisture level, residue present, past yield, past weed pressure, etc.

VIII. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for identifying and treating plants with a farming machine 100 including a control system 130 executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for managing treatment fluid in a tank of a farming machine:
   accessing historical information describing a previous state of a field, previous conditions for the field, and previous farming machine actions performed in the field;
   applying a tank management model to the accessed historical information to:
   determine, for each of a plurality of field portions, an expected density of weeds within each of the portions of the field, and
   determine an amount of treatment fluid required to treat plants within the field based on the expected density of the weeds within each field portion;

while the farming machine is treating the plants in the field with the treatment fluid, accessing current information describing a current state of the field;

applying the tank management model to the accessed current information to determine an updated density of the weeds within field portions that have not yet been treated; and performing, by the farming machine and based on the updated density of the weeds, a modified plant treatment action based on a comparison of a remaining amount of the treatment fluid within a tank of the farming machine and an updated amount of treatment fluid for treating the plants within the field portions that have not yet been treated.

2. The method of claim 1, wherein applying the tank management model to the accessed current information comprises: determining the updated amount of the treatment fluid for the treatment of the plants within the field portions that have not yet been treated.

3. The method of claim 1, wherein the modified plant treatment action includes a drive path of the farming machine, the drive path determined by:

identifying a first subset of field portions in the field portions that have not yet been treated with a weed density confidence less than a weed density confidence threshold;

identifying a second subset of field portions in the fields portions that have not yet been treated with a weed density confidence greater than the weed density confidence threshold; and determining a drive path based on the first subset of field portions and the second subset of field portions; and wherein the farming machine performs the modified plant treatment action along the drive path.

4. The method of claim 1, wherein applying the tank management model to the current information further comprises:

determining an actual weed density within one or more field portions of the plurality of field portions based on the accessed current information; and determining the updated amount of the treatment fluid based on a comparison of the expected weed density within the plurality of field portions within the field and the actual weed density within the one or more field portions of the plurality of field portions.

5. The method of claim 1, wherein performing, the modified plant treatment action comprises any of: varying a pressure of the treatment fluid, changing a vehicle speed of the farming machine, modifying a height of a boom of the farming machine; modifying a flow rate of the treatment fluid, or selecting a nozzle tip for the treatment fluid.

6. The method of claim 1, further comprising:

determining locations of the weeds within the field portions that have not yet been treated;

determining distances between the weeds within the field portions that have not yet been treated; and updating the modified plant treatment action based on the locations of the weeds within the field portions that have not yet been treated and the distances between the weeds within the field portions that have not yet been treated.

7. The method of claim 1, further comprising:

responsive to performing the modified plant treatment action, determining an updated remaining amount of the treatment fluid within the tank; and determining an updated modified plant treatment action based on the updated remaining amount of the treatment fluid within the tank.

8. The method of claim 1, wherein the current information describing the current state of the field is a quantification of current weed locations and current weed numbers.

9. The method of claim 1, wherein the current information describing the current state of the field include at least one of a soil moisture, a sun exposure, a wind exposure, a temperature, a relative humidity, or a pressure.

10. The method of claim 1, wherein accessing the current information describing the current state of the field comprises obtaining the current information from a camera capturing images of the field.

11. The method of claim 1, wherein accessing the current information describing the current state of the field comprises obtaining the current information from a sensor attached to the farming machine.

12. A farming machine configured to perform machine actions as the machine moves through an operational environment, the machine comprising:

a plurality of mechanisms configured to perform the machine actions as the machine travels through the operational environment;

an image sensor to capture a single image of the operational environment as the machine moves through the operational environment; and a processor; and a non-transitory computer readable storage medium comprising instructions that, where executed by the processor, cause the processor to:

access historical information describing a previous state of a field, previous environmental conditions for the field, and previous farming machine actions performed in the field;

apply a tank management model to the accessed historical information to:

determine, for each of a plurality of field portions, an expected density of weeds within each of the portions of the field, and determine an amount of treatment fluid required to treat plants within the field based on the expected density of the weeds within each field portion;

while the farming machine is treating the plants in the field with the treatment fluid, access current information describing a current state of the field;

apply the tank management model to the accessed current information to determine an updated density of the weeds within field portions that have not yet been treated; and perform, by the farming machine and based on the updated density of the weeds, a modified plant treatment action based on a comparison of a remaining amount of the treatment fluid within a tank of the farming machine and an updated amount of the treatment fluid for treating the plants within the field portions that have not yet been treated.

13. The farming machine of claim 12, wherein applying the tank management model to the accessed current information comprises: determining the updated amount of the treatment fluid for the treatment of the plants within the field portions that have not yet been treated.

14. The farming machine of claim 12, wherein the modified plant treatment action includes a drive path of the farming machine, the drive path determined by:

identifying a first subset of field portions in the field portions that have not yet been treated with a weed density confidence less than a weed density confidence threshold;

identifying a second subset of field portions in the fields portions that have not yet been treated with a weed density confidence greater than the weed density confidence threshold; and determining a drive path based on the first subset of field portions and the second subset of field portions; and wherein the farming machine performs the modified plant treatment action along the drive path.

15. The farming machine of claim 12, wherein applying the tank management model to the current information further comprises:

determining an actual weed density within one or more field portions of the plurality of field portions based on the accessed current information; and determining the updated amount of the treatment fluid based on a comparison of the expected density within the plurality of field portions within the field and the actual weed density within the one or more field portions of the plurality of field portions.

16. The farming machine of claim 12, further comprising:

determining locations of the weeds within the field portions that have not yet been treated;

determining distances between the weeds within the field portions that have not yet been treated; and updating the modified plant treatment based on the locations of the weeds within the field portions that have not yet been treated and the distances between the weeds within the field portions that have not yet been treated.

17. A system, comprising:

a computer processor; and a non-transitory computer-readable storage medium storing computer program instructions executable by the computer processor to perform steps of managing treatment fluid in a tank of a farming machine, the steps comprising:

access historical information describing a previous state of a field, previous environmental conditions for the field, and previous farming machine actions performed in the field;

apply a tank management model to the accessed historical information to:

determine, for each of a plurality of field portions, an expected density of weeds within each of the portions of the field, and determine an amount of treatment fluid required to treat plants within the field based on the expected density of the weeds within each field portion;

while the farming machine is treating the plants in the field with the treatment fluid, access current information describing a current state of the field;

apply the tank management model to the accessed current information to determine an updated density of the weeds within field portions that have not yet been treated; and perform, by the farming machine and based on the updated density of the weeds, a modified plant treatment action based on a comparison of a remaining amount of the treatment fluid within a tank of the farming machine and an updated amount of the treatment fluid for treating plants within the field portions that have not yet been treated.

18. The system of claim 17, wherein applying the tank management model to the accessed current information comprises:

determining the updated amount of the treatment fluid for the treatment of the plants within the field portions that have not yet been treated.

19. The system of claim 17, wherein the modified plant treatment action includes a drive path of the farming machine, the drive path determined by:

identifying a first subset of field portions in the field portions that have not yet been treated with a weed density confidence less than a weed density confidence threshold;

identifying a second subset of field portions in the fields portions that have not yet been treated with a weed density confidence greater than the weed density confidence threshold; and determining a drive path based on the first subset of field portions and the second subset of field portions; and wherein the farming machine performs the modified plant treatment action along the drive path.

20. The system of claim 17, wherein applying the tank management model to the current information further comprises:

determining an actual weed density within one or more field portions of the plurality of field portions based on the accessed current information; and determining the updated amount of the treatment fluid based on a comparison of the expected density within the plurality of field portions within the field and the actual weed density within the one or more field portions of the plurality of field portions.

* * * * *